US007559197B2

(12) United States Patent
Verkuilen

(10) Patent No.: US 7,559,197 B2

(45) Date of Patent: Jul. 14, 2009

(54) COMBINER VALVE CONTROL SYSTEM AND METHOD

(75) Inventor: Michael T. Verkuilen, Metamora, IL (US)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 0 days.

(21) Appl. No.: 11/907,768

(22) Filed: Oct. 17, 2007

(65) Prior Publication Data

US 2008/0034746 A1 Feb. 14, 2008

Related U.S. Application Data

(63) Continuation-in-part of application No. 11/214,956, filed on Aug. 31, 2005, now abandoned.

(51) Int. Cl.
*F16D 31/02* (2006.01)

(52) U.S. Cl. .......................................... 60/429; 60/421

(58) Field of Classification Search ................... 60/421, 60/422, 429, 430, 468
See application file for complete search history.

(56) References Cited

U.S. PATENT DOCUMENTS

| | | | |
|---|---|---|---|
| 3,208,221 | A | 9/1965 | Schuetz |
| 4,030,623 | A | 6/1977 | Bridwell et al. |
| 4,078,681 | A | 3/1978 | Field, Jr. |
| 4,210,061 | A | 7/1980 | Bianchetta |
| 4,345,436 | A | 8/1982 | Johnson |
| 4,528,892 | A | 7/1985 | Okabe et al. |
| 5,692,377 | A | 12/1997 | Moriya et al. |
| 6,453,668 | B1 * | 9/2002 | Johnson ....................... 60/468 |

FOREIGN PATENT DOCUMENTS

| | | |
|---|---|---|
| EP | 0772018 | 7/1996 |
| EP | 1726723 | 11/2006 |
| GB | 2422876 | 8/2006 |
| JP | 57-116967 | 7/1982 |
| JP | 3-084204 | 4/1991 |
| JP | 4-019406 | 1/1992 |
| JP | 4-296205 | 10/1992 |
| JP | 6-123302 | 5/1994 |
| JP | 10-082402 | 3/1998 |
| JP | 10082402 | 3/1998 |
| WO | WO 94/10455 | 5/1994 |
| WO | WO 98/41765 | 9/1998 |
| WO | WO 2005-047709 | 5/2005 |
| WO | 2007/027307 | 3/2007 |

* cited by examiner

*Primary Examiner*—Michael Leslie
(74) *Attorney, Agent, or Firm*—Finnegan, Henderson, Farabow, Garrett & Dunner

(57) ABSTRACT

A hydraulic control system for a machine is disclosed. The hydraulic control system may have a first fluid actuator, a first pump configured to produce a first stream of pressurized fluid, a second fluid actuator, and a second pump configured to produce a second stream of pressurized fluid. The hydraulic control system may further have a combiner valve, and a controller. The controller may be configured to receive an operator input indicative of a desired velocity for the first fluid actuator, determine a flow rate for the first fluid actuator corresponding to the desired velocity, and determine a flow capacity of the first pump. The controller may also be configured to move the combiner valve to combine the second stream of pressurized fluid with the first stream of pressurized fluid when the determined flow rate for the first fluid actuator is greater than the determined flow capacity of the first pump.

21 Claims, 4 Drawing Sheets

COMBINER VALVE CONTROL SYSTEM AND METHOD

RELATED APPLICATIONS

This application is a continuation-in-part of U.S. patent application Ser. No. 11/214,956, filed Aug. 31, 2005 now abandoned.

TECHNICAL FIELD

The present disclosure relates generally to a combiner valve, and more particularly, to a system and method for controlling a combiner valve.

BACKGROUND

Machines such as, for example, excavators, loaders, dozers, motor graders, and other types of heavy equipment use multiple actuators supplied with hydraulic fluid from a pump on the machine to accomplish a variety of tasks. These actuators are typically velocity controlled based on an actuation position of an operator interface device. For example, an operator interface device such as a joystick, a pedal, or another suitable operator interface device may be movable to generate a signal indicative of a desired velocity of an associated hydraulic actuator. When an operator moves the interface device, the operator expects the hydraulic actuator to move at an associated predetermined velocity. However, when multiple actuators are simultaneously operated, the hydraulic fluid flow from a single pump may be insufficient to move all of the actuators at their desired velocities. Situations also exist where the single pump is undersized and the desired velocity of a single actuator requires a fluid flow rate that exceeds a flow capacity of the single pump.

One method of selectively combining the hydraulic fluid flow from multiple pumps to move a single actuator is described in U.S. Pat. No. 4,528,892 (the '892 patent) issued to Okabe et al. on Jul. 16, 1985. The '892 patent describes a machine hydraulic circuit system having a first valve group and a second valve group. The first valve group includes a swing valve, a first boom valve, a first arm (e.g., stick) valve, a first bucket valve, and a left travel valve. The swing valve and first boom valve are connected in parallel, and together are connected in interrupted series with the first arm valve, first bucket valve, and left travel valve. The second valve group includes a right travel valve, a second arm valve, a second bucket valve, and a second boom valve. The second arm valve, second bucket valve, and second boom valve are connected in parallel, and together are connected in interrupted series with the right travel valve. The first and second arm valves function to supply fluid from a first pump and a second pump, respectively, to an arm actuator. The first and second bucket valves function to supply fluid from the first and second pumps, respectively, to a bucket actuator. The first and second boom valves function to supply fluid from the first and second pumps, respectively, to a boom actuator. The left and right travel valves function to supply fluid from the first and second pumps, respectfully, to left and right travel actuators. A selector valve selectively fluidly couples the first and second valve groups in response to a desired travel operation.

The location of each of the control valves within the hydraulic circuit system of the '892 patent is such that, when initiating a swing, boom, arm, or bucket movement, without travel of the machine, a combined fluid flow from the first and second pumps powers the movement. In addition, when turning to the left and simultaneously initiating a swing, boom, arm, or bucket motion, fluid from both first and second pumps still powers the movement. However, when turning to the right, although fluid from the first pump is available to the swing, boom, arm, and bucket actuators, fluid from the second pump is only available to the left travel actuator. Further, when traveling straight, although fluid from the first pump is available to the swing, boom, arm, and bucket actuators, fluid from the second pump is only available to the left and right travel actuators.

Because of the interrupted series relationships described above with regard to the '892 patent, if independent swing and boom motions are desired, an operator must take care to manipulate the control lever such that only one of the first and second boom control valves is actuated (e.g., move the control lever less than halfway through its available range of motion). During a swing or boom motion, regardless of the care of the operator or the desired velocity, fluid from only the second pump is only ever available for a stick function.

Although the hydraulic circuit system of the '892 patent may combine pump fluid flows to improve control of some functions, operation of the machine may be inconsistent and limited. In particular, because fluid flow is available from both pumps for swing, boom, arm, and bucket motions during a left turn, but only available from a single pump during a right turn, control of the machine may be difficult and confusing. In addition, the fluid flow available during a right turn may be insufficient for some operations.

Further, because of the limitations of the hydraulic circuit system of the '892 patent and the care that must be taken when operating the associated machine, operational costs of the machine may be substantial. In particular, the care required of the operator to independently and simultaneously initiate a swing and boom movement, may necessitate the use of highly-trained, experienced, and costly operators to run the machine. In addition, there may be situations when a combined pump flow for an arm movement is desired simultaneous to a boom or swing movement. Because these simultaneous operations are unavailable from the machine of the '892 patent, efficiency and production of the machine may be inadequate for certain applications.

In addition, the hydraulic circuit system of the '892 patent may be expensive. Specifically, because two valves are required to provide combined flows to each fluid actuator, the cost of the system may be substantial.

The disclosed control system is directed to overcoming one or more of the problems set forth above.

SUMMARY OF THE INVENTION

One aspect of the present disclosure is directed to a hydraulic control system. The hydraulic control system may include a first fluid actuator, and a first pump configured to produce a first stream of pressurized fluid directed to the first fluid actuator. The hydraulic control system may also include a second fluid actuator, and a second pump configured to produce a second stream of pressurized fluid directed to the second fluid actuator. The hydraulic control system may further include a combiner valve with a valve element movable to combine the second stream of pressurized fluid with the first stream of pressurized fluid directed to the first fluid actuator, and a controller in communication with the combiner valve. The controller may be configured to receive an operator input indicative of a desired velocity for the first fluid actuator, determine a flow rate for the first fluid actuator corresponding to the desired velocity, and determine a flow capacity of the first pump. The controller may also be configured to move the valve element of the combiner valve to combine the second stream of pressurized fluid with the first stream of pressurized fluid directed to the first fluid actuator when the determined flow rate for the first fluid actuator is greater than the determined flow capacity of the first pump.

Another aspect of the present disclosure is directed to a method of operating a hydraulic control system. The method may include directing a first stream of pressurized fluid to a first fluid actuator, and directing a second stream of pressurized fluid to a second fluid actuator. The method may also include receiving an operator input indicative of a desired velocity for the first fluid actuator, determining a flow rate for the first fluid actuator corresponding to the desired velocity, and determining a maximum flow rate of the first stream of pressurized fluid. The method may additionally include combining the second stream of pressurized fluid with the first stream of pressurized fluid and directing the combined streams of pressurized fluid to the first fluid actuator when the determined flow rate for the first fluid actuator is greater than the maximum flow rate of the first stream of pressurized fluid.

DETAILED DESCRIPTION

Figure 1:
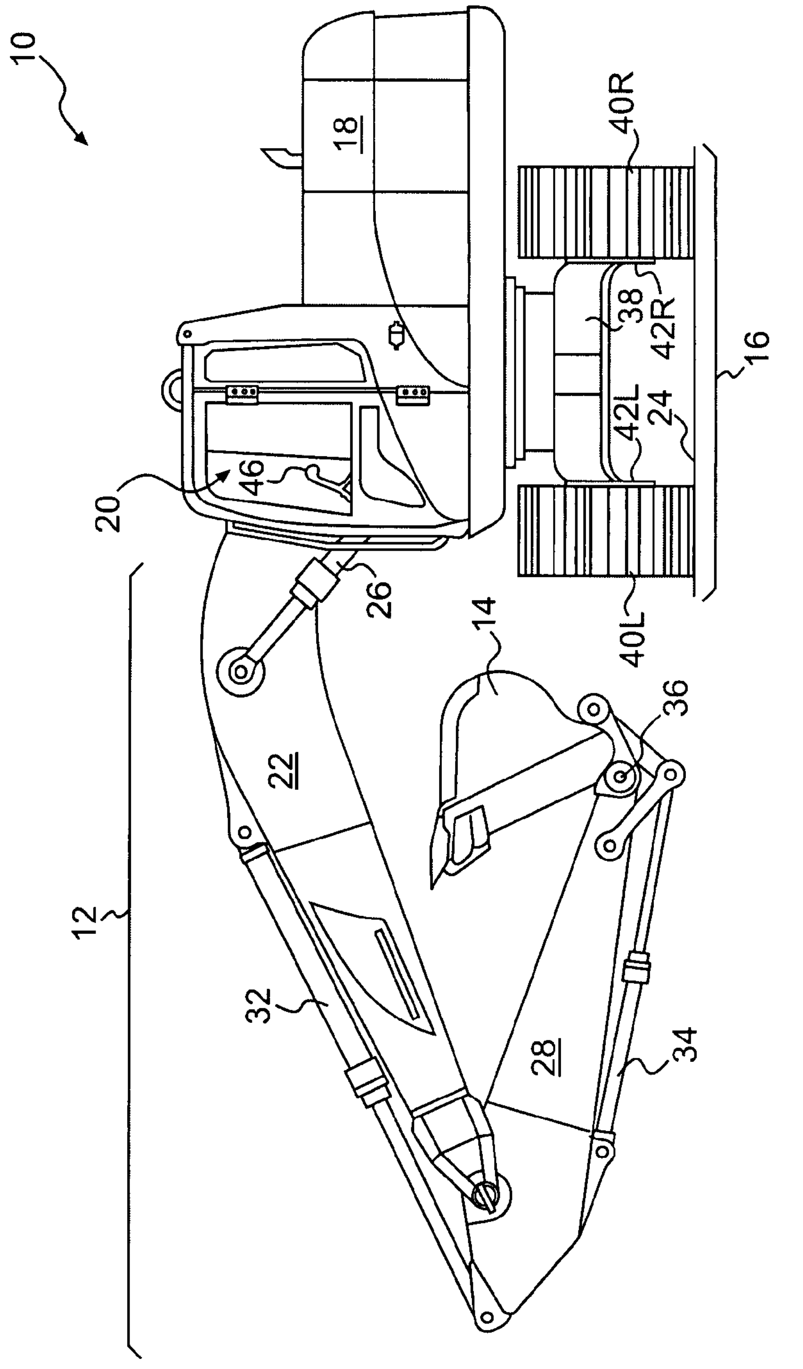
FIG. 1 is a side-view diagrammatic illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or any other industry known in the art. For example, machine 10 may be an earth moving machine such as an excavator, a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 for operator control of implement and drive systems 12, 16.

Implement system 12 may include a linkage structure acted on by fluid actuators to move work tool 14. Specifically, implement system 12 may include a boom member 22 vertically pivotal about a horizontal axis (not shown) relative to a work surface 24 by a pair of adjacent, double-acting, hydraulic cylinders 26 (only one shown in FIG. 1). Implement system 12 may also include a stick member 28 vertically pivotal about a horizontal axis 30 by a single, double-acting, hydraulic cylinder 32. Implement system 12 may further include a single, double-acting, hydraulic cylinder 34 operatively connected to work tool 14 to pivot work tool 14 vertically about a horizontal pivot axis 36. Boom member 22 may be pivotally connected to a frame 38 of machine 10. Stick member 28 may pivotally connect boom member 22 to work tool 14 by way of pivot axis 30 and 36.

Each of hydraulic cylinders 26, 32, 34 may include a tube and a piston assembly (not shown) arranged to form two separated pressure chambers. The pressure chambers may be selectively supplied with pressurized fluid and drained of the pressurized fluid to cause the piston assembly to displace within the tube, thereby changing an effective length of hydraulic cylinders 26, 32, 34. The flow rate of fluid into and out of the pressure chambers may relate to a velocity of hydraulic cylinders 26, 32, 34, while a pressure differential between the two pressure chambers may relate to a force imparted by hydraulic cylinders 26, 32, 34 on the associated linkage members. The expansion and retraction of hydraulic cylinders 26, 32, 34 may function to assist in moving work tool 14.

Numerous different work tools 14 may be attachable to a single machine 10 and controllable via operator station 20. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot relative to machine 10, work tool 14 may alternatively or additionally rotate, slide, swing, lift, or move in any other manner known in the art.

Drive system 16 may include one or more traction devices to propel machine 10. In one example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. In the example of FIG. 1, machine 10 may be steered by generating a speed and or rotational direction difference between left and right travel motors 42L, 42R, while straight travel may be facilitated by generating substantially equal output speeds and rotational directions from left and right travel motors 42L, 42R.

Each of left and right travel motors 42L, 42R may be driven by creating a fluid pressure differential. Specifically, each of left and right travel motors 42L, 42R may include first and second chambers (not shown) located to either side of an impeller (not shown). When the first chamber is filled with pressurized fluid and the second chamber is drained of fluid, the impeller may be urged to rotate in a first direction. Conversely, when the first chamber is drained of the fluid and the second chamber is filled with the pressurized fluid, the respective impeller may be urged to rotate in an opposite direction. The flow rate of fluid into and out of the first and second chambers may determine a rotational velocity of left and right travel motors 42L, 42R, while a pressure differential between left and right travel motors 42L, 42R may determine a torque.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left and right travel motors 42L, 42R.

Operator station 20 may be configured to receive input from a machine operator indicative of a desired work tool and/or machine movement. Specifically, operator station 20 may include one or more operator interface devices 46 embodied as single or multi-axis joysticks located proximal an operator seat. Operator interface devices 46 may be proportional-type controllers configured to position and/or orient work tool 14 by producing a work tool position signal that is indicative of a desired work tool velocity. Likewise, the same or other operator interface devices 46 may be configured to position and/or orient machine 10 relative to work surface 24 by producing a machine position signal indicative of a desired machine velocity. It is contemplated that different operator interface devices may alternatively or additionally be included within operator station 20 such as, for example, wheels, knobs, push-pull devices, switches, pedals, and other operator interface devices known in the art.

Figure 2:
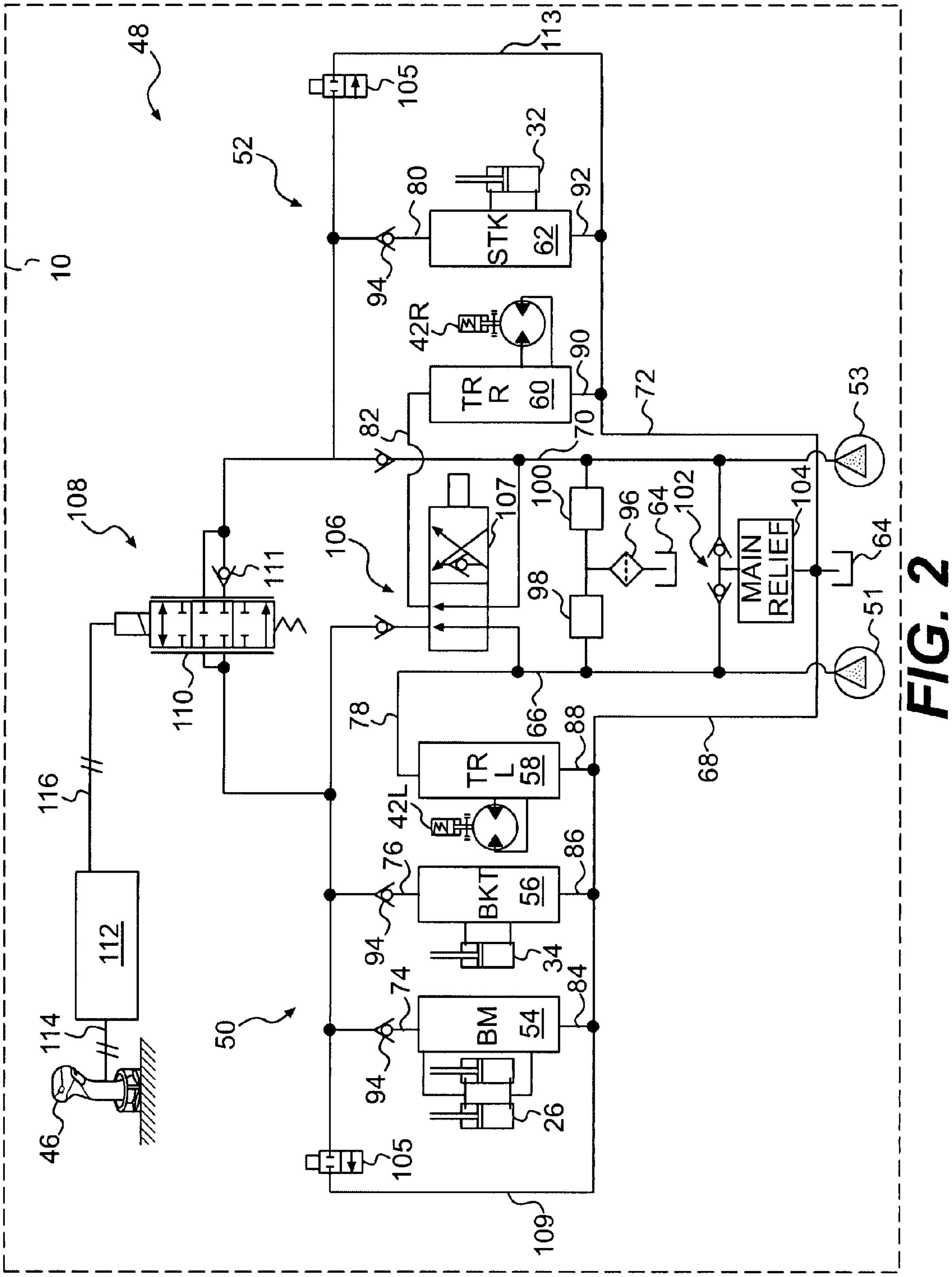
FIG. 2 is a schematic illustration of an exemplary disclosed hydraulic control system that may be used with the machine of FIG. 1.

As illustrated in FIG. 2, machine 10 may include a hydraulic control system 48 having a plurality of fluid components that cooperate to move work tool 14 (referring to FIG. 1) and machine 10. In particular, hydraulic control system 48 may include a first circuit 50 configured to receive a first stream of pressurized fluid from a first source 51, and a second circuit 52 configured to receive a second stream of pressurized fluid from a second source 53. First circuit 50 may include a boom control valve 54, a bucket control valve 56, and a left travel control valve 58 connected to receive the first stream of pressurized fluid in parallel. Second circuit 52 may include a right travel control valve 60 and a stick control valve 62 connected in parallel to receive the second stream of pressurized fluid. It is contemplated that additional control valve mechanisms may be included within first and/or second circuits 50, 52 such as, for example, a swing control valve configured to control a swinging motion of implement system 12 relative to drive system 16, one or more attachment control valves, and other suitable control valve mechanisms.

First and second sources 51, 53 may draw fluid from one or more tanks 64 and pressurize the fluid to predetermined levels. Specifically, each of first and second sources 51, 53 may embody a pumping mechanism such as, for example, a variable displacement pump, a fixed displacement pump, or another source known in the art. First and second sources 51, 53 may each be separately and drivably connected to power source 18 of machine 10 by, for example, a countershaft (not shown), a belt (not shown), an electrical circuit (not shown), or in any other suitable manner. Alternatively, each of first and second sources 51, 53 may be indirectly connected to power source 18 via a torque converter, a reduction gear box, or in another suitable manner. First source 51 may produce the first stream of pressurized fluid independent of the second stream of pressurized fluid produced by second source 53. The first and second streams of pressurized fluids may be at different pressure levels and/or flow rates.

Tank 64 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 64. It is contemplated that hydraulic control system 48 may be connected to multiple separate fluid tanks or to a single tank.

Each of boom, bucket, left travel, right travel, and stick control valves 54-62 may regulate the motion of their related fluid actuators. Specifically, boom control valve 54 may have elements movable to control the motion of hydraulic cylinders 26 associated with boom member 22, bucket control valve 56 may have elements movable to control the motion of hydraulic cylinder 34 associated with work tool 14, and stick control valve 62 may have elements movable to control the motion of hydraulic cylinder 32 associated with stick member 28. Likewise, left travel control valve 58 may have valve elements movable to control the motion of left travel motor 42L, while right travel control valve 60 may have elements movable to control the motion of right travel motor 42R.

The control valves of first and second circuits 50, 52 may be connected to allow pressurized fluid to flow to and drain from their respective actuators via common passageways. Specifically, the control valves of first circuit 50 may be connected to first source 51 by way of a first common supply passageway 66, and to tank 64 by way of a first common drain passageway 68. The control valves of second circuit 52 may be connected to second source 53 by way of a second common supply passageway 70, and to tank 64 by way of a second common drain passageway 72. Boom, bucket, and left travel control valves 54-58 may be connected in parallel to first common supply passageway 66 by way of individual fluid passageways 74, 76, and 78, respectively, and in parallel to first common drain passageway 68 by way of individual fluid passageways 84, 86, and 88, respectively. Similarly, right travel and stick control valves 60, 62 may be connected in parallel to second common supply passageway 70 by way of individual fluid passageways 82 and 80, respectively, and in parallel to second common drain passageway 72 by way of individual fluid passageways 90 and 92, respectively. A check valve 94 may be disposed within each of fluid passageways 74, 76, and 80 to provide for unidirectional supply of pressurized fluid to control valves 54, 56, and 62, respectively.

Because the elements of boom, bucket, left travel, right travel, and stick control valves 54-62 may be similar and function in a related manner, only the operation of boom control valve 54 will be discussed in this disclosure. In one example, boom control valve 54 may include a first chamber supply element (not shown), a first chamber drain element (not shown), a second chamber supply element (not shown), and a second chamber drain element (not shown). The first and second chamber supply elements may be connected in parallel with fluid passageway 74 to fill their respective chambers with fluid from first source 51, while the first and second chamber drain elements may be connected in parallel with fluid passageway 84 to drain the respective chambers of fluid. To extend hydraulic cylinders 26, the first chamber supply element may be moved to allow the pressurized fluid from first source 51 to fill the first chambers of hydraulic cylinders 26 with pressurized fluid via fluid passageway 74, while the second chamber drain element may be moved to drain fluid from the second chambers of hydraulic cylinders 26 to tank 64 via fluid passageway 84. To move hydraulic cylinders 26 in the opposite direction, the second chamber supply element may be moved to fill the second chambers of hydraulic cylinders 26 with pressurized fluid, while the first chamber drain element may be moved to drain fluid from the first chambers of hydraulic cylinders 26. It is contemplated that both the supply and drain functions may alternatively be performed by a single element associated with the first chamber and a single element associated with the second chamber, or by a single valve that controls all filling and draining functions.

The supply and drain elements may be solenoid movable against a spring bias in response to a command. In particular, hydraulic cylinders 26, 32, 34 and left and right travel motors 42L, 42R may move at a velocity that corresponds to the flow rate of fluid into and out of the first and second chambers. To achieve the operator-desired velocity indicated via the interface device position signal, a command based on an assumed or measured pressure may be sent to the solenoids (not shown) of the supply and drain elements that causes them to open an amount corresponding to the necessary flow rate. The command may be in the form of a flow rate command or a valve element position command. It is also contemplated that the supply and drain elements may be pilot operated, if desired.

The common supply and drain passageways of first and second circuits 50, 52 may be interconnected for makeup and relief functions. In particular, first and second common supply passageways 66, 70 may receive makeup fluid from tank 64 by way of a common filter 96 and first and second bypass elements 98, 100, respectively. As the pressure of the first or second streams of pressurized fluid drops below a predetermined level, fluid from tank 64 may be allowed to flow into first and second circuits 50, 52 by way of common filter 96 and first or second bypass elements 98, 100, respectively. In addition, first and second common drain passageways 68, 72 may relieve fluid from first and second circuits 50, 52 to tank 64. As fluid within first or second circuits 50, 52 exceeds a predetermined pressure level, fluid from the circuit having the excessive pressure may drain to tank 64 by way of a shuttle valve 102 and a common main relief element 104.

A straight travel valve 106 may selectively rearrange left and right travel control valves 58, 60 into a parallel relationship with each other. In particular, straight travel valve 106 may include a valve element 107 movable from a neutral position toward a straight travel position. When valve element 107 is in the neutral position, left and right travel control valves 58, 60 may be independently supplied with pressurized fluid from first and second sources 51, 53, respectively, to control left and right travel motors 42L, 42R separately. When valve element 107 is in the straight travel position, left and right travel control valves 58, 60 may be connected in parallel to receive pressurized fluid from only first source 51 for dependent movement. The dependent movement of left and right travel motors 42L, 42R may function to provide substantially equal rotational speeds of left and right tracks 40L, 40R, thereby propelling machine 10 in a straight direction.

When valve element 107 of straight travel valve 106 is moved to the straight travel position, fluid from second source 53 may be substantially simultaneously directed via valve element 107 through both first and second circuits 50, 52 to drive hydraulic cylinders 26, 32, 34. The second stream of pressurized fluid from second source 53 may be directed to hydraulic cylinders 26, 32, 34 of both first and second circuits 50, 52 because all of the first stream of pressurized fluid from first source 51 may be nearly completely consumed by left and right travel motors 42L, 42R during straight travel of machine 10. It should be appreciated that hydraulic control system 48 may alternatively be arranged in a complimentary manner, with respect to straight travel valve 106, such that when valve element 107 is in the straight travel position, left and right travel control valves 58, 60 may be connected in parallel to receive pressurized fluid from only second source 53, while fluid from first source 51 may be substantially simultaneously directed via valve element 107 through both first and second circuits 50, 52 to boom, bucket, and stick control valves 54, 56, 62.

A combiner valve 108 may combine the first and second streams of pressurized fluid from first and second common supply passageways 66, 70 for high speed movement of one or more fluid actuators. In particular, combiner valve 108 may include a valve element 110 movable between a unidirectional open or flow-passing position, a closed or flow-blocking position, and a bidirectional open or flow-passing position. When in the unidirectional open position, fluid from first circuit 50 may be allowed to flow into second circuit 52 (e.g., through a check valve 111) in response to the pressure of first circuit 50 being greater than the pressure within second circuit 52 by a predetermined amount. The predetermined amount may be related to a spring bias of check valve 111 and fixed during a manufacturing process. In this manner, when a right travel or stick function requires a rate of fluid flow greater than an output capacity of second source 53, and the pressure within second circuit 52 begins to drop, fluid from first source 51 may be diverted to second circuit 52 by way of valve element 110. Although shown downstream of combiner valve 108, it should be appreciated that check valve 111 may alternatively be included upstream of combiner valve 108 or within combiner valve 108. When in the closed position, substantially all flow through combiner valve 108 may be blocked. When in the bidirectional open position, however, the first stream of pressurized fluid may be allowed to flow to second circuit 52 to combine with the first stream of pressurized fluid directed to control valves 60-62, and the second stream of pressurized fluid may be allowed to flow to first circuit 50 to combine with the first stream of pressurized fluid directed to control valves 54-58, depending on an assumed or measured pressure differential across combiner valve 108.

Combiner valve 108 may be modulated continuously to any position between the unidirectional open, closed, and bidirectional open positions. In this manner, a degree of the flow of pressurized fluid may be controlled based on, for example, the commanded velocities of control valves 54-62, the commanded flow rates of sources 51, 53, and/or the pressure differential across combiner valve 108. For example, valve element 110 may be solenoid movable against a spring bias in response to a command such as a current command. In an exemplary embodiment, the current command may range from 0 A to 2 A, where 0 A may correspond to valve element 110 being positioned substantially completely in the unidirectional open position, 1 A may correspond to valve element 110 being positioned substantially completely in the closed position, and 2 A may correspond to valve element 110 being positioned substantially completely in the bidirectional open position. Further, the position of valve element 110 between the unidirectional open position and the closed position may correspond proportionately to current commands between 0 A and 1 A. Similarly, the position of valve element 110 between the closed position and the bidirectional open position may correspond proportionately to current commands between 1 A and 2 A. The current command may be sent to the solenoid of combiner valve 108 to cause valve element 110 to move toward the commanded position, which may correspond to a desired amount of flow through combiner valve 108. It should be appreciated that valve element 110 may alternatively be controlled in any other manner known in the art, such as, for example, through a pilot or opposing solenoids.

Hydraulic control system 48 may also include a controller 112 in communication with operator interface device 46, combiner valve 108, and the supply and drain elements of control valves 54-62. Specifically, controller 112 may be in communication with operator interface device 46 by way of a communication line 114, with combiner valve 108 by way of a communication line 116, and with the supply and drain elements of control valves 54-62 via additional communication lines (not shown). It is contemplated that controller 112 may also be in communication with other components of hydraulic control system 48 such as, for example, first and second sources 51, 53, common main relief element 104, first and second bypass elements 98, 100, straight travel valve 106, and other such components of hydraulic control system 48.

Controller 112 may embody a single microprocessor or multiple microprocessors that include a means for controlling an operation of hydraulic control system 48. Numerous commercially available microprocessors can be configured to perform the functions of controller 112. It should be appreciated that controller 112 could readily be embodied in a general machine microprocessor capable of controlling numerous machine functions. Controller 112 may include a memory, a secondary storage device, a processor, and any other components for running an application. Various other circuits may be associated with controller 112 such as power supply circuitry, signal conditioning circuitry, solenoid driver circuitry, and other types of circuitry.

One or more maps relating the interface device position signal, desired actuator velocity, associated flow rates, and/or valve element position, for hydraulic cylinders 26, 32, 34 and left and right travel motors 42L, 42R may be stored in the memory of controller 112. Each of these maps may include a collection of data in the form of tables, graphs, and/or equations. In one example, desired velocity and commanded flow rate may form the coordinate axis of a 2-D table for control of the first and second chamber supply elements. The commanded flow rate required to move the fluid actuators at the desired velocity and the corresponding valve element position of the appropriate supply element may be related in another separate 2-D map or together with desired velocity in a single 3-D map. It is also contemplated that desired actuator velocity may be directly related to the valve element position in a single 2-D map. Controller 112 may be configured to allow the operator to directly modify these maps and/or to select specific maps from available relationship maps stored in the memory of controller 112 to affect fluid actuator motion. It is contemplated that the maps may additionally or alternatively be automatically selectable based on modes of machine operation.

Controller 112 may be configured to receive input from operator interface device 46 and to command operation of control valves 54-62 in response to the input and the relationship maps described above. Specifically, controller 112 may receive the interface device position signal indicative of a desired velocity and reference the selected and/or modified relationship maps stored in the memory of controller 112 to determine flow rate values and/or associated positions for each of the supply and drain elements within control valves 54-62. The flow rates or positions may then be commanded of the appropriate supply and drain elements to cause filling of the first or second chambers at a rate that results in the desired work tool velocity.

Controller 112 may be configured to affect operation of combiner valve 108 in response to, for example, the commanded velocities of control valves 54-62, the commanded flow rates of sources 51, 53, and/or the pressure differential across combiner valve 108. That is, if the determined flow rates associated with the desired velocities of particular fluid actuators meet predetermined criteria, controller 112 may cause valve element 110 to move toward the unidirectional flow-passing position to supply additional pressurized fluid to second circuit 52, cause valve element 110 to move toward the bidirectional flow-passing position to supply additional pressurized fluid to first circuit 50 and/or second circuit 52, or inhibit valve element 110 from moving out of the closed position. The predetermined criteria will be discussed below with regard to FIGS. 3 and 4.

Figure 3:
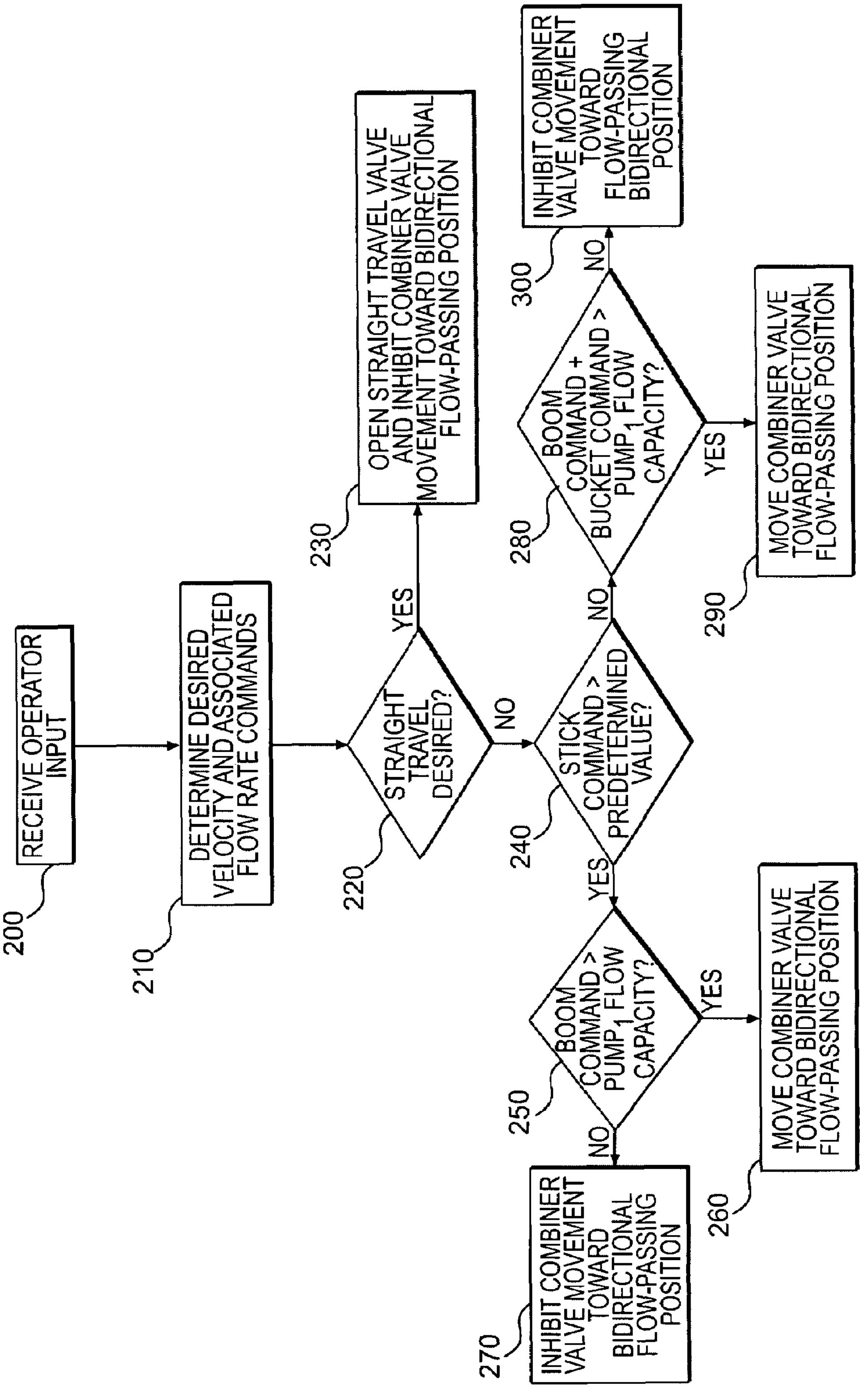
FIG. 3 is a flow chart illustrating an exemplary disclosed method of operating the control system of FIG. 2.
Figure 4:
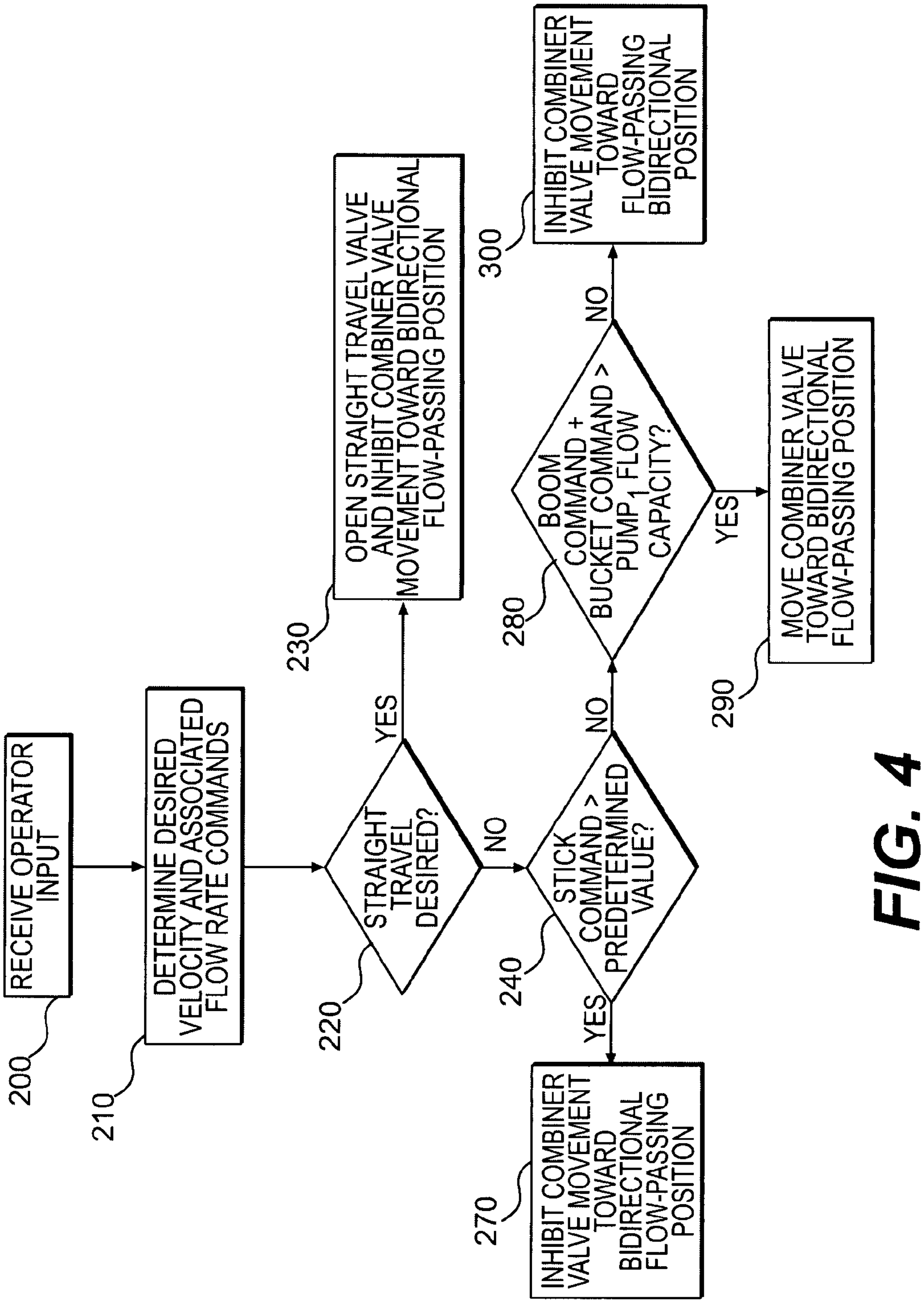
FIG. 4 is a flow chart illustrating another exemplary disclosed method of operating the control system of FIG. 2.

FIGS. 3 and 4 illustrate exemplary methods of operating hydraulic control system 48. FIGS. 3 and 4 will be discussed in the following section to further illustrate the disclosed system and its operation.

In one embodiment, hydraulic control system may also include a warm-up circuit. That is, the common supply and drain passageways 66, 68 and 70, 72 of first and second circuits 50, 52, respectively, may be selectively communicated via first and second bypass passageways 109, 113 for warm-up and/or other bypass functions. A bypass valve 105 may be located in each of bypass passageways 109, 113 and configured to direct fluid from common supply passageways 66 and 70 to common drain passageways 68 and 72, respectively. Each bypass valve 105 may include a valve element movable from a closed or flow-blocking position to an open or flow-passing position. In this configuration, when bypass valve 105 is in the open position, such as during start up of machine 10, fluid pressurized by first and second sources 51, 53 may be allowed to circulate through first and second circuits 50, 52 with very little restriction (i.e., without passing through control valves 54-62). After warm-up, the valve elements of bypass valves 105 may be moved to the closed positions so that the pressure of the fluid in first and second circuits 50, 52 may build and be available for control valves 54-62, as described above. It is contemplated that bypass passageways 109, 113 and bypass valves 105 may be omitted, if desired.

INDUSTRIAL APPLICABILITY

The disclosed hydraulic control system may be applicable to any machine that includes multiple fluid actuators where velocity predictability under varying loads and operational modes is desired. The disclosed hydraulic control system may improve operator control by selectively combining the pressurized fluid flows from multiple pumps and directing the combined flows to appropriate ones of the multiple fluid actuators. The operation of hydraulic control system 48 will now be explained.

During operation of machine 10, a machine operator may manipulate operator interface device 46 to cause a movement of work tool 14. The actuation position of operator interface device 46 may be related to an operator-expected or desired velocity of work tool 14 and/or machine 10. Operator interface device 46 may generate a position signal indicative of the operator-expected or desired velocity during manipulation thereof, and send this position signal to controller 112.

Controller 112 may receive input during operation of hydraulic cylinders 26, 32, and 34 and left and right travel motors 42L, 42R, and make determinations based on the input. As indicated in the flow chart of FIG. 3, controller 112 may receive the operator interface device position signal (Step 200) and determine desired velocities for each fluid actuator within hydraulic control system 48, and the corresponding flow rate commands for both control valves 54-62 and sources 51, 53 (Step 210). From the interface device position signal, controller 112 may also determine whether or not straight travel of machine 10 is desired (Step 220).

If straight travel of machine 10 is desired, valve element 107 of straight travel valve 106 may be moved away from the neutral position and toward the straight travel position. When valve element 107 is moved toward the straight travel position, valve element 110 of combiner valve 108 may be inhibited from moving toward the bidirectional open position (Step 230). Valve element 110 may be held in the unidirectional open position, in the closed position, or between the unidirectional open and closed positions during straight travel of machine 10, because the second stream of pressurized fluid may already be supplying fluid to hydraulic cylinders 26 and 34 via straight travel valve 106.

If straight travel of machine 10 is undesired, controller 112 may then determine if stick member 28 is moving, and at what velocity it is moving. In particular, controller 112 may compare the flow rate commanded of stick control valve 62 to a predetermined threshold value (Step 240). If the flow rate command exceeds the predetermined threshold value, there may not be enough excess flow from second source 53 for flow combining with the first stream of pressurized fluid. If the excess flow from second source 53 is less than the predetermined value and flow combining occurs, stick member 28 may move at a slow and unexpected velocity.

If the flow rate commanded of stick control valve 62 exceeds the predetermined value, controller 112 may then determine if boom member 22 is being manipulated, and to what extent. Specifically, controller 112 may compare the flow rate commanded of boom control valve 54 to the flow capacity of first source 51 (Step 250). Priority within hydraulic system 48 may be such that when the flow rate commanded of boom control valve 54 exceeds the flow capacity of first source 51, the flow rate commanded of boom control valve 54 may be honored and valve element 110 moved to the bidirectional flow-passing position, even if the flow rate commanded of stick control valve 62 exceeds the predetermined value (Step 260). However, if the flow rate commanded of boom control valve 54 is less than the flow capacity of first source 51, valve element 110 may be held in the unidirectional flow-passing position and inhibited from moving to the bidirectional flow-passing position (Step 270).

If the flow rate commanded of stick control valve 62 is less than the predetermined threshold value, valve element 110 of combiner valve 108 may still be moved toward the bidirectional flow-passing position under certain conditions. For example, controller 112 may determine if the sum of the flow rates commanded of boom control valve 54 and bucket control valve 56 exceeds the flow capacity of first source 51 (Step 280). If this sum does exceed the flow capacity of first source 51, valve element 110 of combiner valve 108 may be moved toward the bidirectional flow-passing position to combine the second stream of pressurized fluid with the first stream of pressurized fluid and to direct the combined flow to first circuit 50 for use by hydraulic cylinders 26 and 34 (Step 290). However, if the sum of the flow rates commanded of boom control valve 54 and bucket control valve 56 does not exceed the flow capacity of first source 51, valve element 110 of combiner valve 108 may be held in the unidirectional flow-passing position and inhibited from moving to the bidirectional flow-passing position (Step 300).

Similar to the method of FIG. 3, the alternative method of FIG. 4 includes steps 200-240. However, in contrast to the method of FIG. 3, in the method of FIG. 4, if the flow rate commanded of stick control valve 62 exceeds the predetermined threshold value, no flow combining may ever occur, regardless of the flow rate commanded of boom control valve 54. More specifically, if the flow rate commanded of stick control valve 62 exceeds the predetermined threshold value, control may proceed directly to step 270, where valve element 110 may be held in the unidirectional flow-passing position.

Several benefits may be associated with the control strategy and hardware of hydraulic control system 48. Specifically, during a boom operation requiring a flow rate less than the flow capacity of first source 51, excess flow from first source 51 may be diverted to second circuit 52 by way of valve element 110 to increase the speed of a stick operation. This increased stick speed may facilitate productivity and efficiency of machine 10. In addition, because the combining of the first and second streams of pressurized fluid may be accomplished via a dedicated combiner valve, few control valves may be required. The reduction in the number of control valves may reduce the cost of machine 10.

Because hydraulic control system 48 may provide consistent operation of machine 10 when turning in any direction, the operational cost of machine 10 may be minimal. In particular, the consistent operation of machine 10 may simplify control of machine 10. The simplified control of machine 10 may lower the operating costs of machine 10 by requiring minimal operator training, experience, and skill.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:
- a first fluid actuator;
- a first pump configured to produce a first stream of pressurized fluid directed to the first fluid actuator;
- a second fluid actuator;
- a second pump configured to produce a second stream of pressurized fluid directed to the second fluid actuator;
- a combiner valve having a valve element movable to combine the second stream of pressurized fluid with the first stream of pressurized fluid directed to the first fluid actuator, the combiner valve being movable between a unidirectional flow-combining position, a flow-blocking position, and a bidirectional flow-combining position; and
- a controller in communication with the combiner valve, the controller configured to:
- receive an operator input indicative of a desired velocity for the first fluid actuator;
- determine a flow rate for the first fluid actuator corresponding to the desired velocity;
- determine a flow capacity of the first pump; and
- move the valve element of the combiner valve to combine the second stream of pressurized fluid with the first stream of pressurized fluid directed to the first fluid actuator when the determined flow rate for the first fluid actuator is greater than the determined flow capacity of the first pump.

2. The hydraulic control system of claim 1, wherein the first stream of pressurized fluid is combinable with the second stream of pressurized fluid directed to the second fluid actuator when the combiner valve is moved toward any one of the unidirectional and bidirectional flow-combining positions.

3. The hydraulic control system of claim 2, wherein the second stream of pressurized fluid is only combinable with the first stream of pressurized fluid directed to the first fluid actuator when the combiner valve is moved toward the bidirectional flow-combining position.

4. The hydraulic control system of claim 1, wherein the controller is further configured to:
- determine if straight travel of an associated machine is desired; and
- inhibit movement of the valve element of the combiner valve toward the bidirectional flow-combining position when straight travel is desired.

5. The hydraulic control system of claim 1, wherein the controller is further configured to:
- receive an indication of a desired velocity for the second fluid actuator;
- determine a flow rate for the second fluid actuator corresponding to the desired velocity for the second fluid actuator; and
- inhibit movement of the valve element of the combiner valve toward the bidirectional flow-combining position when the determined flow rate for the second fluid actuator is greater than a predetermined amount.

6. The hydraulic control system of claim 5, wherein movement of the combiner valve toward the bidirectional flow-combining position is only inhibited when the determined flow rate for the first fluid actuator is less than the determined flow capacity of the first pump.

7. The hydraulic control system of claim 1, further including a third fluid actuator, wherein the first stream of pressurized fluid is directed to the third fluid actuator in parallel with the first fluid actuator.

8. The hydraulic control system of claim 7, wherein the controller is further configured to:

receive an indication of a desired velocity for the third fluid actuator;

determine a flow rate for the third fluid actuator corresponding to the desired velocity for the third fluid actuator; and move the valve element of the combiner valve toward the bidirectional flow-combining position when the determined flow rate for the second fluid actuator is less than a predetermined amount and a sum of the determined flow rates for the first and third fluid actuators is greater than the determined flow capacity of the first pump.

9. The hydraulic control system of claim 7, wherein:

the first fluid actuator is associated with a boom member;

the second fluid actuator is associated with a stick member operatively connected to the boom member; and the third fluid actuator is associated with a work tool operatively connected to the stick member.

10. The hydraulic control system of claim 1, wherein the first fluid actuator includes a pair of double-acting hydraulic cylinders.

11. The hydraulic control system of claim 1, further including at least one bypass passageway configured to allow the first stream of fluid to pass to a low pressure tank substantially unrestricted.

12. The hydraulic control system of claim 11, further including a control valve associated with the at least one bypass passageway to selectively open and close the at least one bypass passageway.

13. The hydraulic control system of claim 11, wherein the bypass passageway is opened during a warm-up event.

14. The hydraulic control system of claim 11, wherein the at least one bypass passageway includes:

a first bypass passageway associated with a first circuit connecting the first fluid actuator and the first pump; and a second bypass passageway associated with a second circuit connecting the second fluid actuator and the second pump.

15. A method of operating a hydraulic control system, comprising:

directing a first stream of pressurized fluid to a first fluid actuator;

directing a second stream of pressurized fluid to a second fluid actuator;

receiving an indication of a desired velocity for the first fluid actuator;

receiving an indication of a desired velocity for the second fluid actuator;

determining a flow rate for the first fluid actuator corresponding to the desired velocity;

determining a flow rate for the second fluid actuator corresponding to the desired velocity for the second fluid actuator;

determining a maximum flow rate of the first stream of pressurized fluid;

combining the second stream of pressurized fluid with the first stream of pressurized fluid and directing the combined streams of pressurized fluid to the first fluid actuator when the determined flow rate for the first fluid actuator is greater than the maximum flow rate of the first stream of pressurized fluid; and inhibiting the second stream of pressurized fluid from combining with the first stream of pressurized fluid directed to the first fluid actuator when the determined flow rate for the second fluid actuator is greater than a predetermined amount.

16. The method of claim 15, further including directing the first stream of pressurized fluid to the second fluid actuator in response to a pressure differential between the first and second streams of pressurized fluid.

17. The method of claim 15, further including:

determining if straight travel of an associated machine is desired; and inhibiting the second stream of pressurized fluid from combining with the first stream of pressurized fluid directed to the first fluid actuator when straight travel is desired.

18. The method of claim 15, wherein the second stream of pressurized fluid is only inhibited from combining with the first stream of pressurized fluid directed to the first fluid actuator when the determined flow rate for the first fluid actuator is less than a maximum flow rate of the first stream of pressurized fluid.

19. The method of claim 15, further including directing the first stream of pressurized fluid to a third fluid actuator in parallel with the first fluid actuator.

20. The method of claim 19, further including:

receiving an indication of a desired velocity for the third fluid actuator;

determining a flow rate for the third fluid actuator corresponding to the desired velocity for the third fluid actuator; and combining the second stream of pressurized fluid with the first stream of pressurized fluid and directing the combined stream of pressurized fluid to the first and third fluid actuators when the determined flow rate for the second fluid actuator is less than a predetermined amount and a sum of the determined flow rates for the first and third fluid actuators is greater than the maximum flow rate of the first stream of pressurized fluid.

21. A machine, comprising:

a frame;

a boom member pivotally connected to the frame;

a first fluid actuator configured to affect movement of the boom relative to the frame;

a stick member pivotally connected to the boom member;

a second fluid actuator configured to affect movement of the stick member relative to the boom member;

a work tool operatively connected to the stick member;

a third fluid actuator configured to affect movement of the work tool relative to the stick member;

a first pump configured to produce a first stream of pressurized fluid directed to the first and third fluid actuators in parallel;

a second pump configured to produce a second stream of pressurized fluid directed to the second fluid actuator;

a combiner valve having a valve element movable to any position between a unidirectional flow-combining position at which the first stream of pressurized fluid may be combined with the second stream of pressurized fluid directed to the second fluid actuator, a flow-blocking position at which the first and second streams are blocked from combining with each other, and a bidirectional flow-combining position at which the first and second streams of fluid may be combined into a single stream of fluid directed to any one of the first, second, and third fluid actuators; and a controller in communication with the combiner valve, the controller configured to:

receive operator input indicative of desired velocities for the first, second, and third fluid actuators;

determine flow rates for the first, second, and third fluid actuators corresponding to the desired velocities;

determine a flow capacity of the first pump; and move the valve element of the combiner valve toward the bidirectional flow-combining position when the determined flow rate for the first fluid actuator is greater than the determined flow capacity of the first pump.

* * * * *